United States Patent [19]

Stickle

[11] 4,154,153
[45] May 15, 1979

[54] DRIVE MECHANISM FOR A MECHANIZED TACO SHELL FRYER

[76] Inventor: Daniel T. Stickle, 5410 Ave. T, Lubbock, Tex. 79412

[21] Appl. No.: 856,992

[22] Filed: Dec. 2, 1977

Related U.S. Application Data

[63] Continuation of Ser. No. 655,472, Feb. 5, 1976, abandoned.

[51] Int. Cl.² ............................................. A47J 37/12
[52] U.S. Cl. ...................................... 99/404; 99/353; 99/427; 99/443 C
[58] Field of Search ................. 99/404, 353, 386, 405, 99/407, 410, 427, 431, 443; 198/455, 459, 461, 491, 579; 425/373

[56] References Cited

U.S. PATENT DOCUMENTS

| | | | |
|---|---|---|---|
| 1,919,185 | 7/1933 | Chapman | 99/404 |
| 2,603,143 | 7/1952 | Saenz | 99/404 X |
| 3,132,949 | 5/1964 | Crowe | 99/404 X |
| 3,323,633 | 6/1967 | Engel et al. | 198/455 |
| 3,635,638 | 1/1972 | Bryan | 198/491 X |
| 3,722,400 | 3/1973 | Jimenez | 99/404 X |
| 3,785,273 | 1/1974 | Stickle | 99/404 |
| 3,880,065 | 4/1975 | Stickle | 99/353 |
| 3,946,655 | 3/1976 | Schy | 99/404 |
| 3,948,160 | 4/1976 | Stickle | 99/404 |

Primary Examiner—Harvey C. Hornsby
Assistant Examiner—Arthur O. Henderson
Attorney, Agent, or Firm—Christie, Parker & Hale

[57] ABSTRACT

A taco fryer in which an endless conveyor having a pair of parallel drive chains connected by spaced parallel transverse rods with flexible porous web sections extending between the rods has a portion passing through an elongated vat of cooking oil. Each rod pivotally supports a plunger which rotates between an open position extending away from the web and a closed position lying in contact with the web between the rods. Movement of the conveyor is by a single pair of drive sprockets which engage the respective chains where they pass along a pair of spaced longitudinal slots. As the chains emerge from the slots under the force of the drive sprockets, support of the rods and associated plungers and web section is transferred to spaced tracks. The compressive force on the chains as they are pushed out of the slots causes the chains to buckle and the rods to move together, thereby successively collapsing the sections of web between the rods. Each plunger is tilted from the open position to the closed position prior to the associated rod passing the sprocket drive, so that each folded section of web wraps around the plunger. A tortilla placed on the surface of the web between each adjacent pair of rods is thus folded around the plunger as it enters the cooking oil.

12 Claims, 4 Drawing Figures

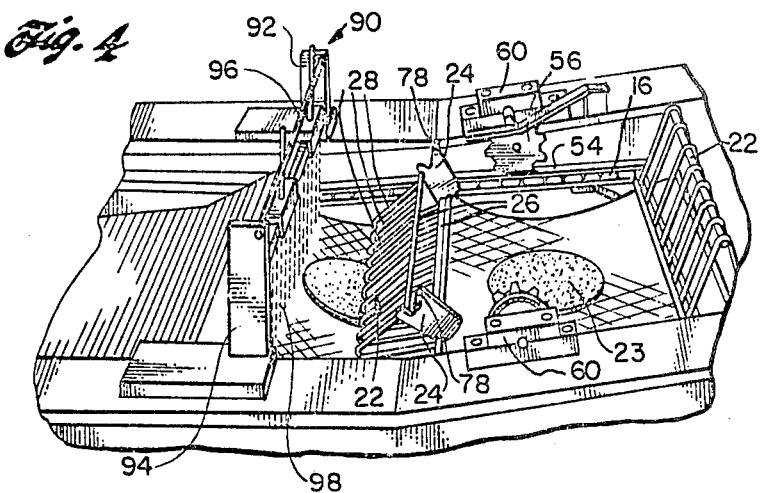
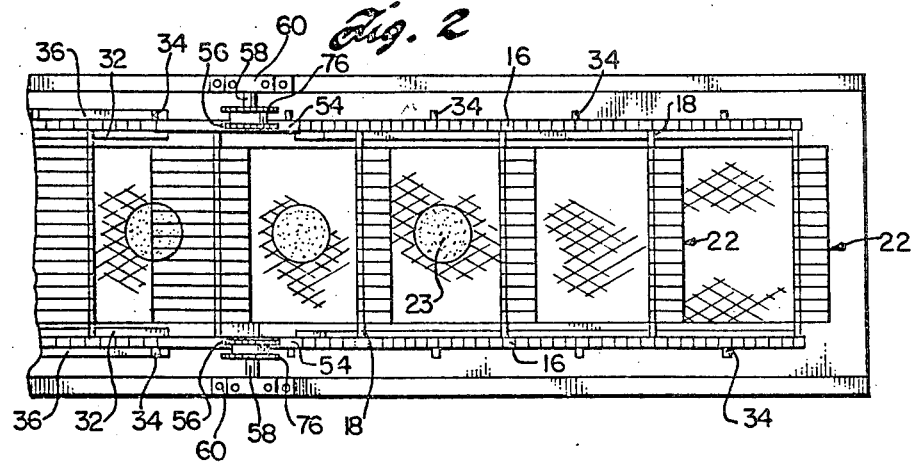
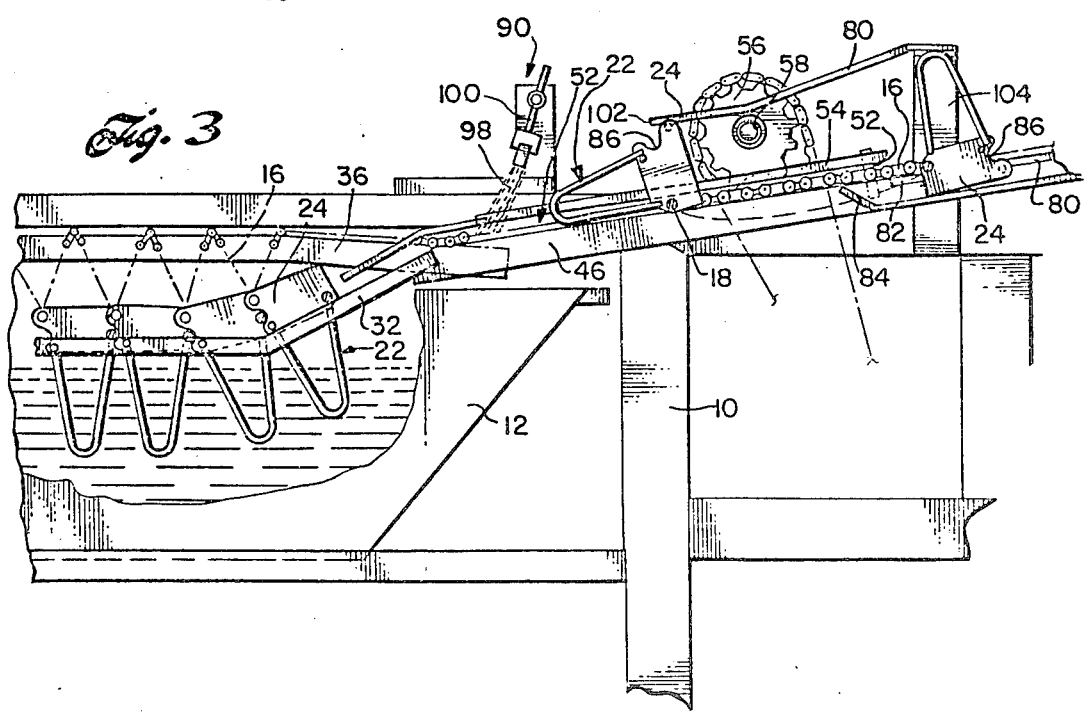

DRIVE MECHANISM FOR A MECHANIZED TACO SHELL FRYER

CROSS-REFERENCED TO RELATED APPLICATION

This application is a continuation of application Ser. No. 655,472, filed Feb. 5, 1976 now abandoned entitled "Drive Mechanism for a Mechanized Taco Shell Fryer".

FIELD OF THE INVENTION

This invention relates to taco frying machines, and more particularly, is concerned with an improved drive mechanism for forming the tortillas into the required shape before frying.

BACKGROUND OF THE INVENTION

In U.S. Pat. No. 3,785,273, there is described an improved machine for efficiently making taco shells of high quality. In the described machine, tortillas are placed on a flexible endless belt which is advanced intermittently through a loading station through a vat of hot cooking oil. After each tortilla is placed on the moving belt, a pivotal plunger carried by the belt is rotated into contact with the tortilla and a section of belt on which the tortilla rests is collapsed around the plunger to form the tortilla into the desired U-shape. Each section of the belt is supported between spaced parallel rods, the ends of which are connected at spaced points along a pair of endless drive chains. Intermittent motion is imparted to the belt when the drive mechanism advances each rod in succession towards the rod in front of its to fold the section of belt around the plunger. Successive collapsed sections of the belt are pushed through the cooking oil vat where separate drive means engaging the chain puts tension on the chain, thereby opening up the folded sections of belt, allowing the plunger to be tilted back away from the belt and the fried tortillas to be removed from the plungers.

SUMMARY OF THE INVENTION

The present invention is directed to an improved drive arrangement for the taco fryer machine described in the above-identified patent. The present drive mechanism eliminates the need for imparting an intermittent drive motion to the conveyor to collapse the belt sections around the plungers. The present invention provides a continuous drive arrangement which permits the endless conveyor arrangement of the taco fryer to be driven at a single point along the length of the endless conveyor loop. The single drive mechanism puts he chain in tension from the point where the belt leaves the frying vat. The same drive pushes the chains toward the vat and collapses the belt in the process. The drive mechanism permits the sections of conveyor to be collapsed around the plunger to fold the tortillas before they enter the vat of cooking oil using the continuous drive rather than the intermittent drive shown in my earilier patent. The result is a much simpler drive mechanism which can be operated at much higher speeds than was heretofore practical with the intermittent type of drive.

In brief, the present invention provides a drive arrangement in which the pair of drive chains associated with the conveyor pass through a pair of parallel slots. The chains are driven continuously by a sprocket drive, engaging the chains as they pass along the slots. The downstream side of the chains is placed under compressive load by the sprocket drive but is restrained from buckling by the associated slots. As the chain emerges from the downstream end of the slots, the chains are formed into loops allowing the conveyor sections to be successively collapsed around the associated plungers.

DESCRIPTION OF THE DRAWINGS

For a more complete understanding of the invention, reference should be made to the accompanying drawings wherein:

FIG. 2 is a top view of the taco frying machine;

FIG. 3 is an enlarged sectional view in elevation of the drive and conveyor collapsing mechanism; and FIG. 4 is a fragmentary prospective view of a portion of the conveyor and associated drive mechanism.

DETAILED DESCRIPTION OF THE DRAWINGS

Figure 1:
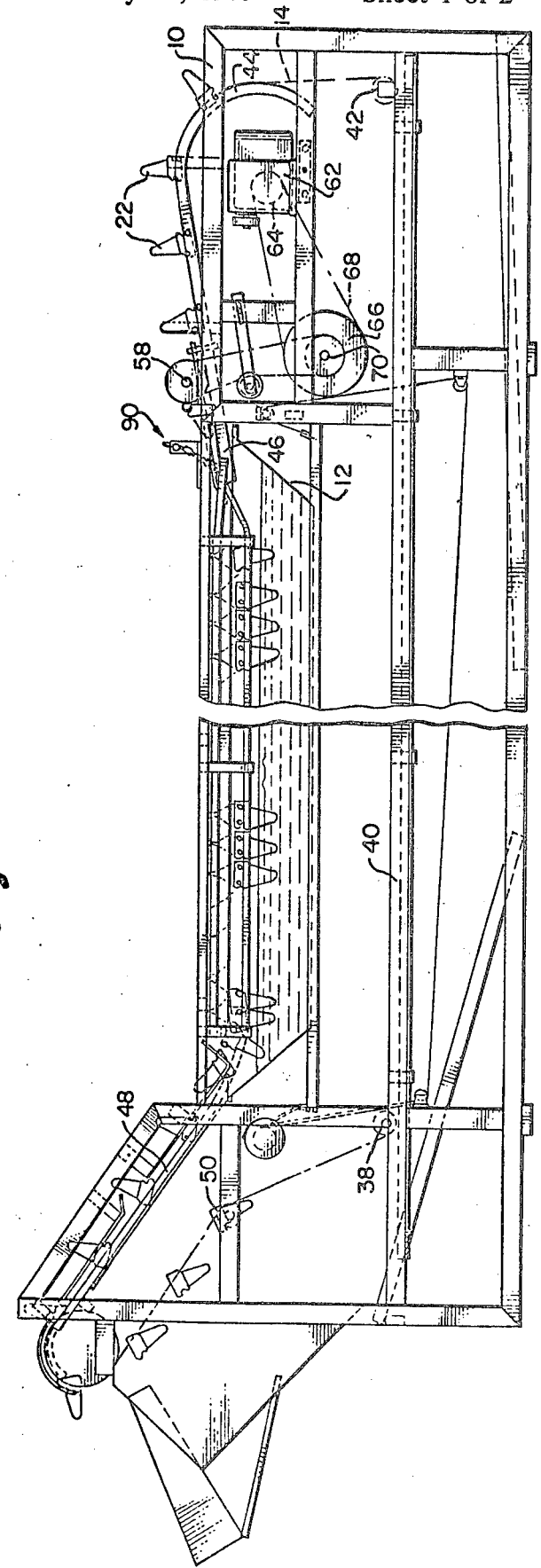
FIG. 1 is a side elevational view of a taco frying machine.

Referring to the drawings in detail, the numeral 10 indicates generally the frame of a taco frying machine generally of the type described in my above-identified U.S. Pat. No. 3,785,273. The frame supports an elongated tank or vat 12 which contains hot grease or cooking fat for frying taco shells. A suitable immersed electric heating element (not shown) heats the fat. The taco shells are moved through the vat 12 by and endless conveyor system indicated generally at 14. As shown in FIG. 1, the conveyor 14 moves down an incline into the right-hand end of the vat, passing through the vat and up an incline at the right-hand end, and returns along the lower portion of the frame 10 beneath the vat in an endless loop.

The conveyor 14 comprises a pair of parallel endless roller type drive chains 16. Extending between and supported by the drive chains at spaced intervals therealong are a plurality of transverse pivot rods 18. Extending between each pair of adjacent pivot rods is a foldable web section preferably constructed from a stainless steel wire chain mesh material. The sections combine to form a continuous belt 20. Each pivot rod 18 hingedly supports a plunger 22 which forms the male mold around which the taco shells are formed in their conventional U-shape during the frying operation.

As described in detail in the above-identified patent, as a section of the conveyor approaches the vat, the plungers 22 are initially in an upright or open position in which they project substantially perpendicular to the path of the conveyor. This allows the operator to place the flat tortillas, indicated at 23, onto the flexible conveyor belt 20 between the adjacent rods 18. As each conveyor section is driven forward, in a manner hereinafter more fully described, the associated plunger 22 is tipped on its side so as to extend over the top of the tortilla. The flexible section between two rods of conveyor is then collapsed and folded with the tortilla around the plunger by interrupting the movement of the forward pivot rod, while moving the trailing pivot rod forward as the conveyor 14 enters the vat 12. The tortilla is thus folded around the plunger to provide the desired shape. As successive conveyor sections are collapsed in this manner, the folded sections move the tortillas through the cooking oil.

As the conveyor 14 emerges from the opposite end of the vat 12 and is pulled up an incline, the conveyor belt sections are again stretched out to a relatively flat condition and the plungers 22 are tilted back to their upright or open position. As the conveyor 14 is directed downwardly in a loop at the end of the machine, the taco shells fall off the plungers where they can be collected for packaging or other processing.

As described in the above-identified patent, the collapsing of the conveyor belt sections around the plungers to mold the taco shells as they pass through the cooking oil has been accomplished heretofore by pushing each rod successively toward the pivot rod immediately in front of it as the conveyor enters the vat. This has been accomplished in part by a reciprocating rachet mechanism which engaged one rod at a time and advanced it a sufficient distance to collapse the belt around the plunger. The rachet mechanism then recycled to back off and engage the next rod and advance it, thus resulting in an intermittent movement of the conveyor as it advanced toward and into the vat. A separate continuous drive was required for withdrawing the conveyor from the vat and returning the conveyor in the endless loop back to the intermittent drive mechanism.

The present invention provides an improved mechanism for collapsing the conveyor belt around the plungers using a single continuous drive rather than a combined continuous drive and intermittent drive as described in the above patent.

The operation of the drive mechanism can be best understood by first considering in more detail the construction of the conveyor 14. With particular reference to FIG. 3, the plungers 22 span the width of the conveyor belt sections 20. The plungers include a pair of cam plates 24 which are pivotally supported at one corner on the pivot rod 18 between the margins of the conveyor belt and the drive chains 16. The pair of cam plates 24 of each plunger are rigidly joined by a pair of bars 26 to which are joined a plurality of V-shaped wire loops 28. A pair of guide rollers are journaled on each rod 18 between the cam plates 24 and the drive chains 16 which operate to movably support the conveyor belt on guide tracks 32 located inside the vat 12. In addition, the drive chains 16 are provided with support pins 34 which are positioned at intervals along the drive chains at points substantially half way between the pivot rods 18. The pin project outboard of the drive chain and engage a pair of parallel chain support tracks 36 extending parallel to each other above the vat 12.

Except while passing through the vat 12 when the conveyor belt sections are collapsed around the plungers during which the conveyor belts are supported on the tracks 32 and the drive chains are supported on the tracks 36, the conveyor 14 is supported by tracks which engage the rollers of the drive chains 16. Thus, the drive chains of the conveyor on the return loop after passing around a pair of idler sprockets 38 pass along a pair of horizontal parallel lower tracks 40. The drive chains 16 then pass around another pair of idler sprockets 42 from where they move upwardly into tangential contact with rear tracks 44. The rear tracks 44 initially extend in the arc of a circle upwardly and toward the vat 12, terminating in a slightly inclined section which ends immediately above the vat 12, as indicated at 46.

As the conveyor leaves the opposite end of the vat 12, the drive chains move up a pair of incline tracks 48 and then curve downwardly around an guide to a pair of idler sprockets 50 to complete the closed loop.

To drive the conveyor 14 in the closed loop according to the present invention, the drive chains as they move down the incline section 45 of the rear tracks 44, pass through longitudinal slots 52 formed by elongated chain guide members 54. As the drive chains 16 pass through the slots 52, they are engaged by a pair of drive sprockets 56 mounted on a shaft 58 journaled at either end in support brackets 60 attached to the frame 10. The shaft 58 is driven continuously from a suitable motor and gear box assembly indicated generally at 62 having an output drive sprocket 64. The sprocket 64 drives a sprocket 66 through a chain drive 68 mounted on a jack shaft 70. A drive means 72 couples a sprocket 74 on the jack shaft 70 to a sprocket 76 on the shaft 58. The drive sprockets 56 and shaft 58 are rotated in a direction to move the conveyor drive chains 16 towards the vat 12. This puts the drive chain under tension on the upstream side of the drive sprockets. This tension is transmitted through the drive chains back to the point where the conveyor is withdrawn from the downstream end of the vat 12 as a result of pulling the conveyor up the incline out of the vat. Sufficient slack is provided in the length of the drive chains so that the conveyor belt sections can be folded around the plungers as they move through the vat, all as described in the above-identified patent.

As the drive chains pass around the rear tracks 44, the plungers are held in the upright or open position by means of cam rollers 78 which project from the cam plates 24. The cam rollers engage the underside of the guide rail 80 as the drive chains move into engagement with the arcuate portion of the rear tracks 44. The guide rails terminate, as indicated at 82, at the point where the chain slots 52 commence. At this point, the cam rollers 78 engage inclined camming members 84 which urge the cam rollers 78 upwardly, thereby causing the plungers 22 to be tipped forward into the closed postion against the tortillas lying on the conveyor belt.

After passing the point of engagement with the drive sprockets 56, the drive chains 16 are in a state of compression but are constrained from buckling by the confining action of the slots 52. It will be seen from FIG 3 that the lower end of the chain guide members is spaced from the sprocket 56 slightly in excess of the distance between adjacent rods 18 when the web section is fully extended. However, as the drive chains emerge from the slots 52 at the lower ends of the chain guide members 54, the resistance of the conveyor sections in the vat 12 causes the drive chains to buckle upwardly under the compressive loud imposed on the chains and off the rear tracks 44 adjacent the ends 46. As the drive chains buckles as they emerge from the slots 52, no drive force is imparted to the conveyor in the region where it enters the vat 12. This allows each plunger as it enters the vat to advance toward the plunger immediately ahead of it. Under the action of gravity, the flexible conveyor section between the now stationary rod 18 and the advancing rod 18 immediately behind it folds around the associated plunger 22, the plunger 22 pivoting in the process so as to project substantially downwardly between the two adjacent rods as they close on each other.

As each plunger and its associated rod are advanced by this process toward the plunger and rod immediately in front of it, a notch 86 in the associated cam plates 24 engages the cam rollers 78 of the immediately preceding plunger, thereby locking the plunger in the downward position. This permits a compressive force to be transmitted from the drive sprockets 56 through the drive chains confined in the slots 52 through the succession of interlock cam plates and associated plungers as they are pushed along the guide tracks 32 through the vat 12.

As the drive chains buckle during the collapsing action of each belt section around its associated plunger, the slack loops of chain are lifted by the action of the support pins 34 riding up onto the chain support tracks 36.

It is desirable to provide means for centering the tortilla between adjacent rods of each web section so that a symmetrical taco shell is formed around the plunger. To this end a centering brush assembly, indicated generally at 90, functions to center the tortilla in a fore and aft direction in a manner described in detail in my U.S. Pat. No. 3,880,065. The brush assembly includes supporting brackets 92 and 94 mounted on top of the frame at either side of the conveyor approximately at the position where the conveyor drive chains emerge from the slots 52. A supporting rod 96 extends between the two brackets so as to bridge the conveyor. A wire brush 98 extends downwardly into contact with the tortilla, the brush 98 being supported on spaced vertical rods 100 which are adjustably secured to the bridging rod 96.

Since the associated plunger 22, as it approaches the brush, has been tilted to its closed position in which the weight of the plunger clamps the tortilla against the web section, the brush does not readily move the tortilla to achieve the desired centering action, but may rather act to curl over the edge of the tortilla. To prevent this and improve the centering action by the brush, the plunger 22 is momentarily lifted off the tortilla as it is moved along at a constant velocity by the drive chains passing through the slots 52. The lifting action is achieved by a stationary cam member 102 supported from the frame by a support bracket 104. The cam member 102 is in the form of an elongated guide extending at an angle to the slots 52 which converge in the direction of motion of the conveyor. The cam guide member 102 provides a caming surface which engages one of the cam rollers 78, urging the cam roller to move backward and downwardly relative to the direction of motion of the conveyor and thereby pivoting the plunger 22 about its supporting rod and lifting the plunger off the tortilla momentarily until the cam roller passes beneath the end of the cam member 102. By momentarily lifting the plunger 22 off the tortilla, the brush can center the tortilla on the associated web section by a very light brushing contact with the tortilla as it is moved along by the conveyor. A similar stationary cam member may be positioned on the other side of the conveyor.

While the present invention has been specifically described in combination with a taco shell fryer, the invention has general application to other mechanized frying machines. Thus it is contemplated that the same drive can be used in any frying machine having a collapsing mold arrangement in which the mold is collapsed by shortening the conveyor chain drive in the direction of motion as the conveyor moves into the drying vat. For example, it is obvious that a tostada frying machine of the type described in copending application Ser. No. 550,528, filed Feb. 18, 1975, now issued as U.S. Pat. No. 3,948,160 the present invention as the conveyor drive by replacing the wire mesh and plunger as herein described by a rigid folding wire framework used in the tostada fryer.

What is claimed is:

1. In a fryer for tacos, tostadas, or the like, comprising an endless conveyor having a pair of parallel drive chains connected by spaced parallel rods with foldable web sections supported on and extending between the rods, apparatus for continuously moving the conveyor in a closed loop path and folding each of the web sections in succession at a predetermined point along said path by pushing each rod toward the preceding rod to fold the sections and push the folded web sections through a vat of cooking oil, an improved chain drive comprising: chain guide means comprising lower tracks and upper chain guide members defining a pair of spaced parallel longitudinal slots, each of said slots having an open end adjacent the inlet to the vat of cooking oil, the chains extending within said slots, the chains being constrained by the slots so that the chains can transmit compressive loads without buckling while passing through the slots, drive means engaging the chains in the slots to push the chains along the slots ahead of the drive means at substantially constant velocity, the slots maintaining the chains in a fixed path, and track means adjacent the inlet to the vat of cooking oil for supporting and guiding the rods as the chains are pushed out from the ends of the slots by the drive means, the compression force on the chains on the downstream side of the drive means causing the chains to buckle between the rods causing a rod attached to the chains within the slots to be pushed toward the preceding rod where the chains emerge from the slots.

2. Apparatus of claim 1 further comprising: additional track means adjacent to but on the outside of the portion of the chains extending from the downstream end of the slots, and support means projecting outwardly from the chains at points intermediate the rods, the support means engaging the additional track means, the additional track means being positioned above the first-mentioned track means supporting the rods.

3. Apparatus of claim 1 wherein the slots are inclined downwardly from the horizontal in the direction of movement of the chains.

4. Apparatus of claim 2 wherein the slots are inclined downwardly from the horizontal in the direction of movement of the chains.

5. In a food fryer in which an endless conveyor is provided having a pair of parallel endless drive chains connected by spaced transverse parallel rods with a flexible web section supported on and extending between each adjacent pair of rods to form a foldable conveyor section by moving the rods together, and a plurality of plungers, each rod having a plunger hingedly attached thereto, the plungers rotating between an open position extending away from the web and a closed position in contact with a web section between the rods, apparatus for simultaneously advancing the conveyor and folding each web section in sequence around the associated plunger by moving the associated pair of rods towards each other, an improved chain drive comprising: track and guide means defining a pair of spaced parallel longitudinal slots, each having an open exit end, one of the chains extending within each of said slots respectively, the slots constraining the chains in a fixed path without buckling, drive means engaging the chains in the slots to push the chains along the slots at substantially constant velocity, means tilting each plunger from the open position to the closed position while the associated rod-supporting points on the chains are moving along the slots, and track means positioned between the chains for supporting and guiding the rods as the chains are pushed from the open ends of the slots by the drive means, the compression force on the chains on the downstream side of the drive means as the chains emerge from the ends of the slots causing the chains to buckle between adjacent rods and the web section between the rods to fold as the rods are pushed together by the chains.

6. Apparatus of claim 5 further comprising: additional track means adjacent to but on the outside of the portion of the chains extending from the downstream end of the slots, and support means projecting outwardly from the chains at points intermediate the rods, the support means engaging the additional track means, the additional track means being positioned above the first-mentioned track means supporting the rods.

7. Apparatus of claim 5 wherein the slots are inclined downwardly from the horizontal in the direction of movement of the chains.

8. Apparatus of claim 6 wherein the slots are inclined downwardly from the horizontal in the direction of movement of the chains.

9. A fryer for frying tortillas in the shape of a taco shell, comprising a frame, an elongated vat for holding hot cooking fat, and endless moving conveyor system supported on the frame, the conveyor system passing endlessly past, seriatim, a loading station, a drive station, through the vat to an unloading station, and through a return loop below the vat back to the loading station, the conveyor system including a pair of endless drive chains, a plurality of transverse rods extending between the chains at spaced intervals along the chains, and folding web sections extending between the rods, a single continuous drive means including drive sprockets engaging the chains at one point along the length of the chains and moving the chains at constant velocity through the drive station, first guide means for guiding the chain under tension by the pulling force of the drive sprockets from the unloading station through the return loop and the loading station, second guide means extending downstream of the single drive means constraining the chains as they move past the chain sprockets to a linear path without buckling as the chains are pushed ahead under compression by the sprockets from the drive station toward the vat, the second guide means terminating between the drive station and the vat, means for guiding the rods from the point of termination of the second guide means along a first path extending the length of the vat, and means for guiding a portion of the chains intermediate the rods along a second path after the chains emerge from the second guide means, the first and second paths diverging at the point of termination of the second guide means and extending parallel to each other along the length of the vat whereby the chains are in compression within the second guide means, are slack after emerging from the second guide means and are in tension adjacent the first guide means.

10. Apparatus of claim 9 further comprising a plurality of plungers pivotally supported on the rods, and means tilting the plungers toward the preceding adjacent web section as the associated rod moves through the drive station.

11. Apparatus of claim 10 further including cam means mounted on the frame adjacent the second guide means, and cam follower means mounted on each of the plungers, the cam follower means of each plunger engaging the cam means as the associated supporting rod moves along the second guide means, the cam means forcing the engaging cam follower means to lift the plunger away from the associated web section, and means for centering a tortilla supported on the web section while the plunger is lifted by the cam follower means.

12. In a food fryer comprising a frame, an endless drive chain, means connected to the chain for receiving a tortilla to be fried and means for folding such a tortilla before frying, and a cooking oil vat, improved means for continuously advancing the chain drive comprising:
 a chain drive sprocket upstream from the cooking oil vat;
 chain guide means between the chain drive sprocket and the cooking oil vat defining a slot for constraining the chain as it moves under compression past the chain drive sprocket and towards the cooking oil vat to follow a linear path without buckling;
 an open end on the chain guide means adjacent the cooking oil vat for permitting buckling of the drive chain; and
 track means for guiding the drive chain from the cooking oil vat around the frame to the drive sprocket, whereby the drive chain is in tension from the cooking oil vat to the drive sprocket, is in compression within the chain guide means upstream from the cooking oil vat and is slack downstream from the chain guide means adjacent the cooking oil vat.

* * * * *